(12) United States Patent
Cho et al.

(10) Patent No.: US 12,100,846 B2
(45) Date of Patent: Sep. 24, 2024

(54) TUBE-SHAPED CATALYST COMPLEX AND CATALYST SLURRY INCLUDING SAME FOR FUEL CELL

(71) Applicants: HYUNDAI MOTOR COMPANY, Seoul (KR); KIA CORPORATION, Seoul (KR)

(72) Inventors: Yoon Hwan Cho, Seoul (KR); Su Won Seol, Hwaseong-si (KR); Byeong Gab Ji, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/834,931

(22) Filed: Jun. 8, 2022

(65) Prior Publication Data
US 2022/0393187 A1 Dec. 8, 2022

(30) Foreign Application Priority Data
Jun. 8, 2021 (KR) .................. 10-2021-0073890

(51) Int. Cl.
| | |
|---|---|
| *H01M 4/92* | (2006.01) |
| *H01M 4/88* | (2006.01) |
| *H01M 4/90* | (2006.01) |
| *B01J 21/18* | (2006.01) |
| *B01J 23/40* | (2006.01) |

(52) U.S. Cl.
CPC .......... *H01M 4/926* (2013.01); *H01M 4/8892* (2013.01); *H01M 4/9083* (2013.01); *B01J 21/18* (2013.01); *B01J 21/185* (2013.01); *B01J 23/40* (2013.01)

(58) Field of Classification Search
CPC . B01J 21/18; B01J 21/185; B01J 23/40; B01J 35/023; H01M 4/926; H01M 4/8892; H01M 4/9083
USPC ................................. 502/101, 185; 429/524
See application file for complete search history.

(56) References Cited

U.S. PATENT DOCUMENTS

| | | | |
|---|---|---|---|
| 10,511,029 B2 | 12/2019 | Choi et al. | |
| 2006/0110632 A1* | 5/2006 | Hong | B01J 23/42 |
| | | | 502/185 |
| 2013/0244133 A1* | 9/2013 | Wieland | H01M 4/9041 |
| | | | 429/535 |
| 2014/0051013 A1 | 2/2014 | Elabd et al. | |
| 2020/0321626 A1* | 10/2020 | Komini Babu | H01M 8/1093 |

FOREIGN PATENT DOCUMENTS

| | | | | |
|---|---|---|---|---|
| BR | PI0706086 A2 | * | 6/2009 | ............. H01M 8/22 |
| CN | 100421292 C | * | 9/2008 | ............. B01J 23/42 |
| JP | 2008523565 A | | 7/2008 | |
| KR | 20170089486 A | * | 8/2017 | ............. H01M 4/86 |
| KR | 20180088050 A | * | 8/2018 | ............. H01M 4/86 |
| TW | 200921974 A | * | 5/2009 | ......... H01M 4/8626 |
| WO | WO-0209212 A1 | * | 1/2002 | ............. B01D 69/08 |
| WO | WO-2016112976 A1 | * | 7/2016 | ............. G01N 27/416 |

* cited by examiner

*Primary Examiner* — Patricia L. Hailey
(74) *Attorney, Agent, or Firm* — MCDONNELL BOEHNEN HULBERT & BERGHOFF LLP

(57) ABSTRACT

The present disclosure relates to a tube-shaped catalyst complex and a catalyst slurry including the same for a fuel cell. The catalyst complex for a fuel cell comprises a tubular inner layer including an ionomer and an outer layer provided on an outer surface of the inner layer and including a catalyst.

20 Claims, 4 Drawing Sheets

FIG.4B
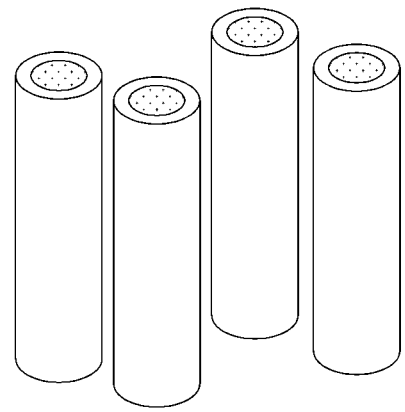
FIG.4C
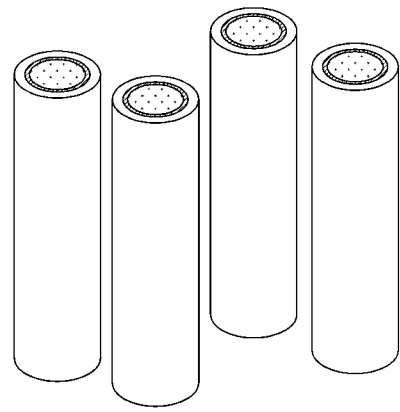
FIG.4D

TUBE-SHAPED CATALYST COMPLEX AND CATALYST SLURRY INCLUDING SAME FOR FUEL CELL

CROSS REFERENCE TO RELATED APPLICATION

The present application claims priority to Korean Patent Application No. 10-2021-0073890, filed Jun. 8, 2021, the entire contents of which is incorporated herein for all purposes by this reference.

BACKGROUND

Field

The present disclosure relates to a tube-shaped catalyst complex and a catalyst slurry including the same for a fuel cell.

DESCRIPTION OF THE RELATED ART

A catalyst for a fuel cell is traditionally used in the form in which a metal catalyst is supported on a porous carbon support or a metal oxide support to accelerate a chemical reaction.

In general, a catalyst slurry is first prepared by mixing the catalyst, a specific solvent such as distilled water or alcohol, and an ion-transport material. Then, the catalyst slurry is applied to a substrate to form an electrode for a fuel cell.

However, the catalyst supported on a support exhibits lower efficiency than an unsupported catalyst because it is difficult for the metal catalyst charged in the pores of the support to come into contact with the ion-transport material.

Therefore, existing catalysts have a limitation in that the performance thereof is significantly influenced by the pore structure and pore distribution of a support and the position of a metal serving as a catalyst.

SUMMARY

Accordingly, the present disclosure is provided, and an objective of the present disclosure is to provide a fuel cell catalyst complex structured such that an ion-transport material can come into contact with the entire surface area of a metal serving as a catalyst.

Another objective of the present disclosure is to provide a fuel cell catalyst complex structured so as not to impede gas movement within an electrode.

Objectives of the present disclosure are not limited to the objectives described above. These and other objectives of the present disclosure may be understood from the following detailed description and will become more fully apparent from the embodiments of the present disclosure. In addition, the objectives of the present disclosure may be realized by the means shown in the appended claims and combinations thereof.

In one aspect of the present disclosure, a catalyst complex for a fuel cell includes a tubular inner layer including an ionomer and a catalyst-containing outer layer provided on the outer surface of the inner layer.

The inner layer may have an inner diameter of 1 nm to 100 nm.

The inner layer may have a length of 20 nm to 200 nm.

The ionomer may include at least one selected from the group consisting of polysulfones, polyetherketones, polyethers, polyesters, polybenzimidazoles, and combinations thereof.

The outer layer may cover 90% or more of the area of the outer surface of the inner layer.

The catalyst may include at least one metal selected from the group consisting of platinum, palladium, rhodium, iridium, ruthenium, and any combination thereof.

In another aspect of the present disclosure, a catalyst slurry for a the catalyst complex described above, an ion-transport material, and a solvent.

The catalyst slurry may contain 20 parts to 80 parts by weight of the ion-transport material, relative to 100 parts by weight of the catalyst complex.

The solvent may include at least one selected from the group consisting of distilled water, ethanol, propanol, butanol, ethylene glycol, and any combination thereof.

The catalyst slurry may further include at least one carbon material selected from the group consisting of carbon black, carbon nanotube, carbon nanofiber, and any combination thereof.

The catalyst slurry may contain 30 parts to 200 parts by weight of the carbon material, relative to 100 parts by weight of the catalyst complex.

In a further aspect of the present disclosure, an electrode for a fuel cell includes the catalyst complex described above and an ion-transport material.

The electrode may contain 20 parts to 80 parts by weight of the ion-transport material relative to 100 parts by weight of the catalyst complex.

The electrode may be 1 μm to 15 μm thick.

In a yet further aspect of the present disclosure, there is provided a method of manufacturing a catalyst complex for a fuel cell, the method including: preparing a rod-shaped structural element containing a transition metal, forming an inner layer including an ionomer on an outer surface of the structural element, forming an outer layer including a catalyst on an outer surface of the inner layer, and treating the resulting structure with an acidic solution to remove the structural element.

The transition metal may include at least one selected from the group consisting of nickel, cobalt, iron, and any combination thereof.

The structural element may have a diameter of 1 nm to 100 nm and a length of 20 nm to 200 nm.

According to the method, the structural element may be removed by treating the resulting structure obtained after the formation of the outer layer with at least one acid selected from the group consisting of sulfuric acid, nitric acid, acetic acid, formic acid, and any combination thereof.

In the catalyst complex according to the present disclosure, the catalyst metal is not supported on a porous support but is coated on the outer surface of the tube-shaped ionomer. Therefore, when the catalyst complex is mixed with the ion-transport material, the ion conductivity of the electrode is greatly increased because the entire surface area including the inner surface and the outer surface of the catalyst metal comes into contact with the ion-transport material.

Since the catalyst complex according to the present disclosure has a void therein, gases such as hydrogen gas and oxygen gas can smoothly move in the electrode.

Effects of the present disclosure are not limited to the effects described above, and the present disclosure has all the effects that can be deduced from the detailed description.

BRIEF DESCRIPTION OF THE DRAWINGS

The above and other objectives, features, and other advantages of the present disclosure will be more clearly under

FIGS. 4A to 4E are views illustrating a method of manufacturing catalyst complexes according to the present disclosure.

DETAILED DESCRIPTION

Figure 1:
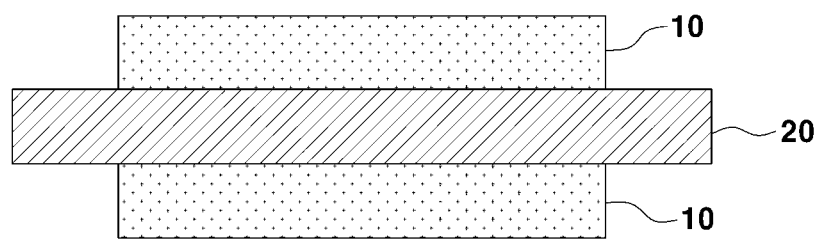
- FIG. 1 is a cross-sectional view illustrating a membrane-electrode assembly (MEA) for a fuel cell according to the present disclosure.

The above and other objectives, features, and advantages of the present disclosure will be more clearly understood from the embodiments below when taken in conjunction with the accompanying drawings. However, the present disclosure is not limited to the embodiments described herein and may be embodied in other forms. The embodiments described herein are presented to form a complete disclosure of the present disclosure and to help those of ordinary skill in the art best understand the disclosure. The scope of the disclosure is defined only by the claims.

Like reference numerals are used throughout the different drawings to designate like elements. In these drawings, the shapes and sizes of members may be exaggerated for explicit and convenient description. It will be understood that, although the terms first, second, etc. may be used herein to describe various elements, these elements: should not be limited by these terms. These terms are only used to distinguish one element from another element. For instance, a first element discussed below could be termed a second element without departing from the teachings of the present disclosure. Similarly, the second element could also be termed the first element. As used herein, the singular forms "a", "an", and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. In addition, it will be understood that, when a layer, a film, a region, or a plate is referred to as being "on" or "under" another layer, another film, another region, or another plate, it can be "directly" or "indirectly" on the other layer, film, region, plate, or one or more intervening layers may also be present.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such a range is continuous, and includes, unless otherwise indicated, every value from the minimum value to and including the maximum value of such range. Still further, where such a range refers to integers, unless otherwise indicated, every integer from the minimum value to and including the maximum value is included.

FIG. 1 is a cross-sectional view illustrating a membrane-electrode assembly (MEA) for a fuel cell, according to the present disclosure. Referring to FIG. 1, the MEA includes a pair of electrodes 10 and an electrolyte membrane disposed between the electrodes 10.

The electrode 10 may include a catalyst complex, an ion-transport material, and the like.

Figure 2:
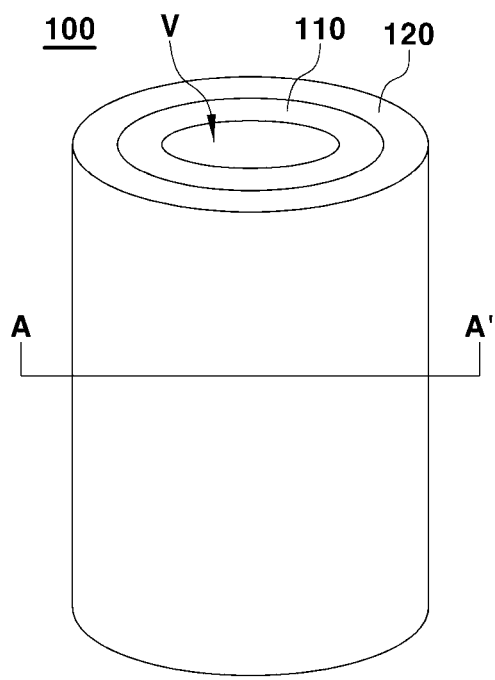
FIG. 2 is a view illustrating a catalyst complex.
Figure 3:
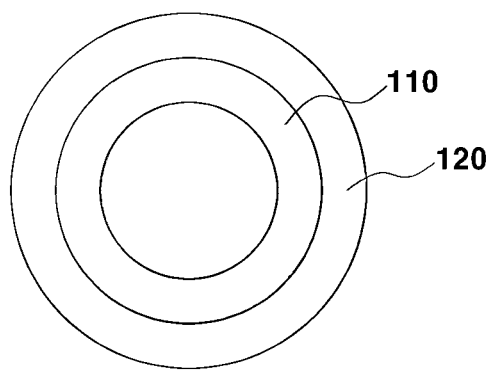
FIG. 3 is a cross-sectional view taken along line A-A' of FIG. 2.

FIG. 2 is a view illustrating a catalyst complex 100, and FIG. 3 is a cross-sectional view taken along line A-A' of FIG. 2. The catalyst complex 100 includes: a tubular inner layer 110 including an ionomer, and an outer layer 120 provided on the outer surface of the inner layer 110 and including a catalyst.

The catalyst complex 100 according to the present disclosure does not have a porous support unlike a conventional platinum/carbon (Pt/C) catalyst. Specifically, the catalyst complex 100 can maintain the shape thereof because the outer layer 120 including the catalyst is supported on the inner layer 110 including the ionomer. There is no region where the use of the catalyst is unavailable because the catalyst is in contact with the ion-transport material on the outside surface thereof, which is to be described later, and in contact with the ion conductive ionomer on the inner surface thereof.

Since the catalyst complex 100 has a one-dimensional linear structure as shown in FIG. 2, the contact resistance between particles is low, so that electrons generated during the reaction of a fuel cell can smoothly move. In addition, since the catalyst complex 100 has an anisotropic shape, the mass transfer can be improved while the electrodes are formed.

The inner layer 110 is in the form of a void tube (V) as shown in FIG. 2. The inner layer 110 may have an inner diameter of 1 nm to 100 nm. When the inner diameter of the inner layer 110 is less than 1 nm, it is difficult for reaction gases to move through the inner layer 110. On the other hand, when the inner diameter exceeds 100 nm, flooding may occur due to the production of water during the reaction.

The inner layer 110 may have a length of 20 nm to 200 nm. When the length of the inner layer 110 is less than 20 nm, it is difficult to maintain the shape of the catalyst complex. On the other hand, when the length exceeds 200 nm, ion conductivity is reduced.

As the ionomer constituting the inner layer 110, any material can be used if the material is conductive to hydrogen ions. For example, at least one selected from the group consisting of polysulfones, polyetherketones, polyethers, polyesters, polybenzimidazoles, and combinations thereof may be used as the ionomer.

The outer layer 120 covers 90% or more, or preferably 95% or more, or more preferably 99% or more of the entire outer surface area of the tubular inner layer 110.

The thickness of the outer layer 120 is not particularly limited. For example, the outer layer 120 may have a thickness in a range of 1 nm to 50 nm, preferably in a range of 1 nm to 20 nm, and more preferably in a range of 1 nm to nm. When the thickness of the outer layer 120 is less than 1 nm, it is difficult to uniformly form the outer layer 120. On the other hand, when the thickness exceeds 50 nm, the efficiency of the catalytic activity of the catalyst per unit amount is significantly reduced.

The catalyst constituting the outer layer 120 includes at least one selected from the group consisting of platinum, palladium, rhodium, iridium, ruthenium, and a combination thereof. A platinum alloy catalyst may include platinum-iridium, platinum-ruthenium, platinum-palladium, and the like.

FIGS. 4A to 4E are views illustrating a method of manufacturing the catalyst complex 100, according to the present disclosure.

The method includes preparing a rod-shaped structural element containing a transition metal, forming an inner layer including an ionomer on the outer surface of the structural element, forming an outer layer including a catalyst on the outer surface of the inner layer, and treating the resulting structure obtained after the outer layer is formed with an acidic solution to remove the structural element.

Figure 4A:
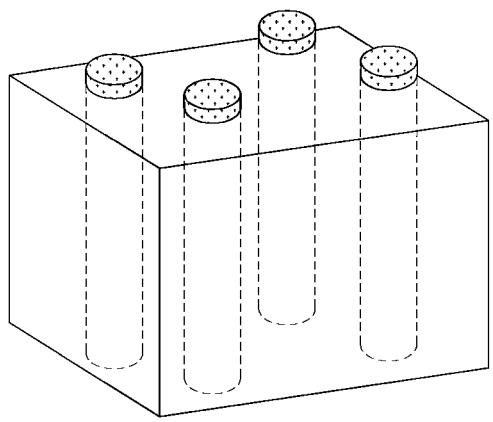

The structural element may be prepared by electrospinning a precursor of a transition metal. Alternatively, the structural element can be prepared by using a series of rod-shaped templates as shown in FIG. 4A. Specifically, the rod-shaped structural element may be manufactured by injecting transition metal nanoparticles or transition metal nanoparticle precursors into the pores of the template.

Any transition metal can be used if the transition metal can be removed by the acid treatment. For example, the transition metal may include at least one selected from the group consisting of nickel, cobalt, iron, and a combination thereof.

In addition, the precursor of the transition metal may be a hydrate or nitride of the transition metal.

The diameter of the structural element may be the same as the inner diameter of the outer layer, and the length of the structural element may be equal to or larger than the length of the outer layer. Specifically, the structural element may have a diameter of 1 nm to 100 nm and a length of 20 nm to 200 nm.

Figure 4B:
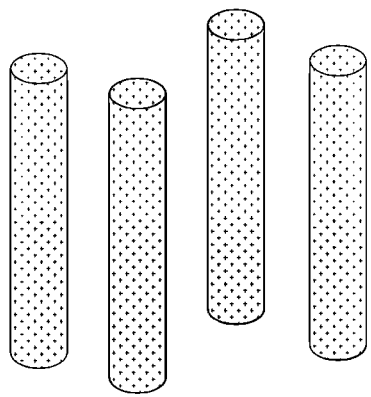

The outer surface of the structural element obtained as shown in FIG. 4B is coated with an ionomer to form the inner layer as shown in FIG. 4C. The inner layer may be formed by spray drying, dip coating, or the like.

For example, in the case of preparing the inner layer by the spray drying, a solution in which the structural element, the ionomer, and the solvent are mixed is dispersed using a stirrer, a disperser, an ultrasonic dispersion, etc., and the resulting structure that is produced is dried at a temperature of 80° C. to 200° C.

Thereafter, as shown in FIG. 4D, the outer layer is formed by coating the outer surface of the inner layer with the catalyst. The outer layer may be formed by sputtering, atomic layer deposition, or the like.

For example, in the case of preparing the outer layer by the sputtering, the catalyst may be sputtered at a power of 30 W to 150 W under vacuum condition to be deposited on the outer surface of the outer layer.

Figure 4E:
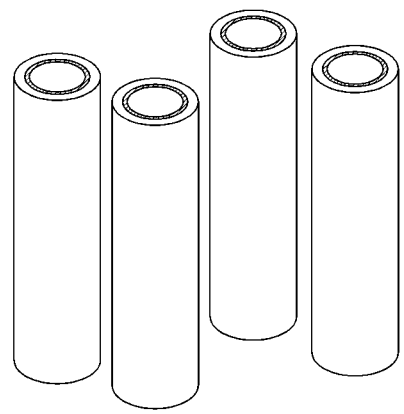

Next, the produced structure in which the structural element, the inner layer, and the outer layer are included is treated with an acidic solution to selectively remove only the structural element. Thus, the catalyst complex according to the present disclosure is obtained as shown in FIG. 4E.

The acidic solution may include at least one selected from the group consisting of sulfuric acid, nitric acid, acetic acid, formic acid, and any combination thereof.

The concentration of the acidic solution is not particularly limited, but the acidic solution preferably has a concentration at which only the structural element containing the transition metal can be selectively removed without causing damage to the inner layer and the outer layer.

A catalyst slurry is prepared using the catalyst complex obtained as described above, and an electrode is prepared from the catalyst slurry.

The catalyst slurry includes the catalyst complex, an ion-transport material, and a solvent.

The ion-transport material may be the same as or different from the ionomer and may include at least one selected from the group consisting of polysulfones, polyetherketones, polyethers, polyesters, polybenzimidazoles, and combinations thereof.

The catalyst slurry may contain 20 parts to 80 parts by weight of the ion-transport material relative to 100 parts by weight of the catalyst complex. When the content of the ion-transport material is less than 20 parts by weight, the electrode made from the catalyst slurry exhibits a low hydrogen ion conductivity, leading to the performance degradation of the fuel cell. On the other hand, when the content exceeds 80 parts by weight, flooding may occur during the operation of the fuel cell.

The solvent includes at least one selected from the group consisting of distilled water, ethanol, propanol, butanol, ethylene glycol, and a combination thereof.

The catalyst slurry may further include a carbon material to improve dispersibility and dimensional stability of the electrode.

The carbon material includes at least one selected from the group consisting of carbon black, carbon nanotube, carbon nanofiber, and any combination thereof.

The catalyst slurry contains 30 parts to 200 parts by weight of the carbon material relative to 100 parts by weight of the catalyst complex.

An electrode may be prepared by applying the catalyst slurry on a substrate using a coating process such as spray coating, bar coating, slot die coating, or the like.

The electrode is 1 μm to 15 μm thick. When the thickness of the electrode is less than 1 μm, flooding may occur while when the thickness exceeds 15 μm, the resistance to mass transfer in the electrode may be excessively large.

The substrate may be a release liner or an electrolyte membrane.

After the catalyst slurry is applied to the surface of a release liner and then dried to form an electrode, the electrode is transferred onto an electrolyte membrane, thereby producing a membrane-electrode assembly (MEA).

The release liner may be a film including at least one selected from the group consisting of polyethylene naphthalate (PEN), polyethylene terephthalate (PET), polytetrafluoroethylene (PTFE), and any combination thereof.

Specifically, the electrode may be prepared by applying the catalyst slurry on the release liner, drying the catalyst slurry at 80° C. to 200° C. for 5 minutes or more.

The electrode may first be placed on the electrolyte membrane and then be heat-compressed. Through this process, the electrode can be transferred onto the electrolyte membrane.

Figure 5:
FIG. 5 is an optical microscope image (Magnification: 160×) of a surface of an electrode manufactured by a method of the present disclosure.

FIG. 5 is an optical microscope image (Magnification: 160×) of a surface of the electrode manufactured by the method according to the present disclosure.

Alternatively, the electrode may be prepared by directly applying and drying the catalyst slurry on the electrolyte membrane.

The electrolyte membrane may be a membrane made of a material having hydrogen ion conductivity, and examples of the material include at least one selected from the group consisting of polysulfones, polyetherketones, polyethers, polyesters, polybenzimidazoles, and combinations thereof.

Although the preferred embodiments of the present disclosure have been described for illustrative purposes with reference to the accompanying drawings, those skilled in the art will appreciate that various modifications, additions and substitutions are possible, without departing from the scope and spirit of the present disclosure as defined in the appended claims.

What is claimed is:

1. A catalyst complex for a fuel cell, the catalyst complex comprising:
   a tubular inner layer in the form of a void tube including an ionomer; and
   an outer layer provided on an outer surface of the inner layer and including a catalyst.

2. The catalyst complex of claim 1, wherein the inner layer has an inner diameter of 1 nm to 100 nm.

3. The catalyst complex of claim 1, wherein the inner layer has a length of 20 nm to 200 nm.

4. The catalyst complex of claim 1, wherein the ionomer includes at least one selected from the group consisting of polysulfones, polyetherketones, polyethers, polyesters, polybenzimidazoles, and combinations thereof.

5. The catalyst complex of claim 1, wherein the outer layer covers 90% or more of the entire outer surface area of the inner layer.

6. The catalyst complex of claim 1, wherein the catalyst includes at least one selected from the group consisting of platinum, palladium, rhodium, iridium, ruthenium, and a combination thereof.

7. A catalyst slurry for a fuel cell, the catalyst slurry comprising a catalyst complex, an ion-transport material, and a solvent,
   wherein the catalyst comprises:
   a tubular inner layer in the form of a void tube including an ionomer; and
   an outer layer provided on an outer surface of the inner layer and including a catalyst.

8. The catalyst slurry of claim 7, wherein the catalyst slurry contains 20 parts to 80 parts by weight of the ion-transport material relative to 100 parts by weight of the catalyst complex.

9. The catalyst slurry of claim 7, the solvent includes at least one selected from the group consisting of distilled water, ethanol, propanol, butanol, ethylene glycol, and a combination thereof.

10. The catalyst slurry of claim 7, further comprising at least one carbon material selected from the group consisting of carbon black, carbon nanotube, carbon nanofiber, and any combination thereof.

11. The catalyst slurry of claim 10, wherein the catalyst slurry contains 30 parts to 200 parts by weight of the carbon material relative to 100 parts by weight of the catalyst complex.

12. An electrode for a fuel cell, the electrode comprising a catalyst complex and an ion-transport material,
    wherein the catalyst comprises:
    a tubular inner layer in the form of a void tube including an ionomer; and
    an outer layer provided on an outer surface of the inner layer and including a catalyst.

13. The electrode of claim 12, wherein the electrode contains 20 parts to 80 parts by weight of the ion-transport material relative to 100 parts by weight of the catalyst complex.

14. The electrode of claim 12, wherein the electrode is 1 μm to 15 μm thick.

15. A method of manufacturing a catalyst complex for a fuel cell, the method comprising:
    preparing a rod-shaped structural element containing a transition metal;
    forming an inner layer including an ionomer on an outer surface of the structural element;
    forming an outer layer including a catalyst on an outer surface of the inner layer; and
    treating the resulting structure with an acidic solution to remove the structural element.

16. The method of claim 15, wherein the transition metal includes at least one selected from the group consisting of nickel, cobalt, iron, and any combination thereof.

17. The method of claim 15, wherein the structural element has a diameter of 1 nm to 100 nm and a length of 20 nm to 200 nm.

18. The method of claim 15, wherein the ionomer includes at least one selected from the group consisting of polysulfones, polyetherketones, polyethers, polyesters, polybenzimidazoles, and combinations thereof.

19. The method of claim 15, wherein the catalyst includes at least one selected from the group consisting of platinum, palladium, rhodium, iridium, ruthenium, and a combination thereof.

20. The method of claim 15, wherein the structural element is removed by treating the resulting structure with the acidic solution including at least one acid selected from the group consisting of sulfuric acid, nitric acid, acetic acid, formic acid, and any combination thereof.

* * * * *